US008490183B2

(12) United States Patent
Kondo et al.

(10) Patent No.: US 8,490,183 B2
(45) Date of Patent: Jul. 16, 2013

(54) SECURITY ENSURING BY PROGRAM ANALYSIS ON INFORMATION DEVICE AND TRANSMISSION PATH

(75) Inventors: Satoshi Kondo, Tokorozawa (JP); Shigeru Yatabe, Toda (JP)

(73) Assignee: Trend Micro Incorporated, Tokyo (JP)

( * ) Notice: Subject to any disclaimer, the term of this patent is extended or adjusted under 35 U.S.C. 154(b) by 1262 days.

(21) Appl. No.: 10/587,609

(22) PCT Filed: Feb. 4, 2005

(86) PCT No.: PCT/JP2005/002104
§ 371 (c)(1),
(2), (4) Date: Jul. 28, 2006

(87) PCT Pub. No.: WO2005/076105
PCT Pub. Date: Aug. 18, 2005

(65) Prior Publication Data
US 2007/0157310 A1    Jul. 5, 2007

(30) Foreign Application Priority Data
Feb. 5, 2004  (JP) ................................. 2004-029928

(51) Int. Cl.
*G06F 11/00* (2006.01)
(52) U.S. Cl.
USPC ................................. 726/22; 726/1; 455/436
(58) Field of Classification Search
USPC .......... 726/1, 22; 713/201; 715/507; 455/436
See application file for complete search history.

(56) References Cited

U.S. PATENT DOCUMENTS

| 5,951,698 | A * | 9/1999 | Chen et al. ....................... 714/38 |
| 6,088,801 | A * | 7/2000 | Grecsek ............................ 726/1 |
| 7,123,914 | B2 * | 10/2006 | Matsubara et al. ........... 455/436 |
| 2003/0056117 | A1 * | 3/2003 | Elgressy et al. ............... 713/201 |
| 2005/0120295 | A1 * | 6/2005 | Sako et al. ..................... 715/507 |
| 2005/0160045 | A1 | 7/2005 | Watanabe et al. |
| 2006/0101511 | A1 * | 5/2006 | Faillenot et al. ................ 726/13 |

FOREIGN PATENT DOCUMENTS

| CN | 1299478 A | 6/2001 |
| JP | A 2001-117769 | 4/2001 |
| JP | A 2001-138611 | 5/2001 |
| JP | A-2001-508564 | 6/2001 |

(Continued)

OTHER PUBLICATIONS

Haiyun Luo ; UCAN: a unified cellular and ad-hoc network architecture; Year of Publication: 2003 ; ISBN:1-58113-753-2 ; pp. 353-367.*

*Primary Examiner* — April Y Blair
(74) *Attorney, Agent, or Firm* — Oliff & Berridge, PLC

(57) ABSTRACT

A receiving device includes a storing unit that stores information on whether a function of a program provided via a network is permitted to be used; a receiving unit; a first receipt control unit that receives, using the receiving unit, before receiving a program via the network, function information indicating a function used in the program; a determining unit that determines whether to receive the program, by comparing function information received by the first receipt control unit and information stored by the storing unit; a second receipt control unit that receives, using the receiving unit, the program via the network if the determining unit determines to receive the program, and that cancels receipt of the program via the network if the determining unit determines not to receive the program; and an executing unit that executes the program received by the second receipt control unit.

6 Claims, 10 Drawing Sheets

FOREIGN PATENT DOCUMENTS

| | | |
|---|---|---|
| JP | A 2002-41170 | 2/2002 |
| JP | A-2002-368820 | 12/2002 |
| JP | A 2003-67210 | 3/2003 |
| WO | WO 99/45454 | 9/1999 |
| WO | WO 99/45454 A1 | 9/1999 |
| WO | WO 00/42498 A1 | 7/2000 |
| WO | WO 03/083646 A1 | 10/2003 |

* cited by examiner

FIG. 2

| PROGRAM | Sample.APP | | |
|---|---|---|---|
| HASH ALGORITHM | MD5 | | |
| HASH ALGORITHM | 0D247FCB001A2BC5FED0000009355FF23 | | |
| FUNCTION | FUNCTION NAME | | |
| | Function 1 ( ) | | |
| | Function 2 ( ) | | |
| | Function 5 ( ) | | |
| | ...... | | |
| ACCESSED RESOURCE | TYPE | RESOURCE | |
| | Network | http://www.xxx.co.jp | |
| | File | Local/UserData/AddressBook | |
| | ...... | ...... | |

| SECURITY LEVEL | LEVEL1 | | | |
|---|---|---|---|---|
| FUNCTION | CATEGORY | | FUNCTION NAME | PERMISSION |
| | FILE ACCESS | | Function 1 ( ) | PROHIBITED |
| | | | Function 2 ( ) | PERMITTED |
| | NETWORK ACCESS | | ALL FUNCTIONS | PROHIBITED |
| | ...... | | | |
| ACCESSED RESOURCE | TYPE | | RESOURCE | PERMISSION |
| | Network | | http://www.xxx.co.jp | USER CONFIRMATION |
| | Data File | | ALL DATA FILES | PROHIBITED |
| | File | | Local/UserData/AddressBook | PROHIBITED |
| | ...... | | | ...... |

507a

US 8,490,183 B2

SECURITY ENSURING BY PROGRAM ANALYSIS ON INFORMATION DEVICE AND TRANSMISSION PATH

TECHNICAL FIELD

The present invention relates to a technique of ensuring security of an information device.

BACKGROUND ART

In an open network such as the Internet, people can freely publicize information or provide programs. Accordingly, there exists a possibility of a malicious program being provided via an open network to, for example, a communication terminal, and which if executed will result in a security breach with information stored in the terminal being read and sent out from the terminal. There are known in the art means to protect communication terminals from such programs. For example, JP2001-117769 discloses a program executing device wherein identification information (for example, an IP address or a URL) indicating reliable sources of programs in a memory in the program executing device; and if identification information indicating a source of a program received via a network is registered in the memory, execution of the program is permitted.

However, in the art disclosed in JP2001-117769, it is necessary to register all reliable program sending sources. Accordingly, each time a reliable program sending source is added or deleted, identification information stored in a memory must be updated. Moreover, since in a large network such as the Internet, there exists a large number of reliable program sending sources, it is substantially difficult to register in a memory of a terminal all identification information thereof. Further, even if it is possible to register in a memory in a terminal all such identification information, in order to do so it is necessary to increase a size of a memory used, particularly of that in a small communication terminal such as mobile phone, which results in an increase in manufacturing costs of such a terminal.

On the other hand, if security is enhanced by, for example, analyzing at a mobile terminal a content of a program received at the mobile terminal via a network to determine whether the program is a security threat, it is necessary for the mobile terminal to have a high level of computing power. Moreover, determination of security threats at the mobile terminal places a heavy load on a processing unit of the mobile terminal and takes a substantial amount of time to complete. Similarly, if at a relay device such as a server on a network, a content of a program received via a network is analyzed to thereby determine whether execution of the program in a communication terminal will constitute a security threat, it is necessary to provide the relay device with a high level of computing power. If the relay device is not provided with sufficient computing power, delays in communications are likely to occur.

The present invention has been made in view of the problems discussed above, and provides a technique of determining, at a receiving device or a relay device, whether a program provided via a network is a security threat, by using a simple method which can be quickly carried out.

DISCLOSURE OF INVENTION

To solve the problems, the present invention provides registering means for registering information on whether a function of a received program is permitted to be used; receiving means for receiving a program and function information indicating a function used in the program; determining means for determining, by comparing function information received by the receiving means and information registered by the registering means, whether a program received by the receiving means includes a function not permitted to be used; and outputting means for outputting a result determined by the determining means.

The present invention also provides a program for causing a computer to function as a receiving device, and provides a computer-readable storage medium for recording the program. The program may be pre-installed in a memory of a computer, or it may be installed in a computer by way of communications conducted via a network, or be installed from the storage medium.

According to the present invention, a receiving device determines whether a prohibited function is present in a received program by comparing function information of the program and information registered by the registering means, and outputs the determination result.

The present invention also provides a receiving device comprising: registering means for registering information on whether a function of a received program is permitted to be used; receiving means for receiving a program and function information indicating a function used in the program; determining means for determining, by comparing function information received by the receiving means and information registered by the registering means, whether to execute a program received by the receiving means; and executing means for executing a program if the determining means determines to execute the program. The present invention also provides a program for causing a computer to function as a receiving device, and provides a computer-readable storage medium for recording the program.

According to the present invention, a receiving device determines whether a received program should be executed by comparing function information of the program and information registered by the registering means.

The present invention also provides a receiving device comprising: registering means for registering means for registering information on whether a function of a received program is permitted to be used; first receiving means for receiving, before receiving a program, function information indicating a function used in the program; determining means for determining whether to receive a program, by comparing function information received by the first receiving means and information registered by the registering means; second receiving means for receiving a program if the determining means determines to receive the program; and executing means for executing a program received by the second receiving means. The present invention also provides a program for causing a computer to function as a receiving device, and a computer-readable storage medium for recording the program.

According to the present invention, a receiving device determines whether a program should be received by comparing function information of the program and information registered by the registering means.

The present invention provides a relay device comprising: registering means for registering information on whether a function of a program provided via a network is permitted to be used; receiving means for receiving a program, function information indicating a function used in the program, and destination information indicating a destination of the program; determining means for determining, by comparing function information received by the receiving means and information registered by the registering means, whether to relay a program received by the receiving means; and sending means for sending a program to a destination designated by destination information received by the receiving means, if the determining means determines to relay the program.

The present invention also provides a program for causing a computer to function as a relay device, and provides a computer-readable storage medium for recording the program. The program may be pre-installed in a memory of a computer, or it may be installed in a computer by way of communications conducted via a network, or be installed from the storage medium.

According to the present invention, a relay device determines whether to relay a received program by comparing function information of the program and information registered by the registering means.

The present invention also provides a relay device comprising: registering means for registering information on whether a function of a program provided via a network is permitted to be used; receiving means for receiving a program, function information indicating a function used in the program, and destination information indicating a destination of the program; determining means for determining, by comparing function information received by the receiving means and information registered by the registering means, whether a function not permitted to be used is used in a program received by the receiving means; and sending means for sending a determination result by the determining means and a program to a destination designated by destination information received by the receiving means, if the determining means determines to relay the program. The present invention also provides a program for causing a computer to function as a relay device, and provides a computer-readable storage medium for recording the program.

According to the present invention, a relay device determines whether a prohibited function is present in a received program by comparing function information of the program and information registered by a registering means, and sends the determination result with the program.

According to the present invention, it can be readily determined at a receiving device or a relay device whether a program provided via a network is one that poses a security threat, by employing a simple method and within a short time.

BRIEF DESCRIPTION OF THE DRAWINGS

FIG. 2 is a diagram illustrating a data structure of inspection result data 202 according to the first embodiment.

FIG. 4 is a diagram illustrating a data structure of security management table 507a according to the first embodiment.

BEST MODE FOR CARRYING OUT THE INVENTION

Below, with reference to the drawings, embodiments of the present invention will be described.

A. First Embodiment

Figure 1:
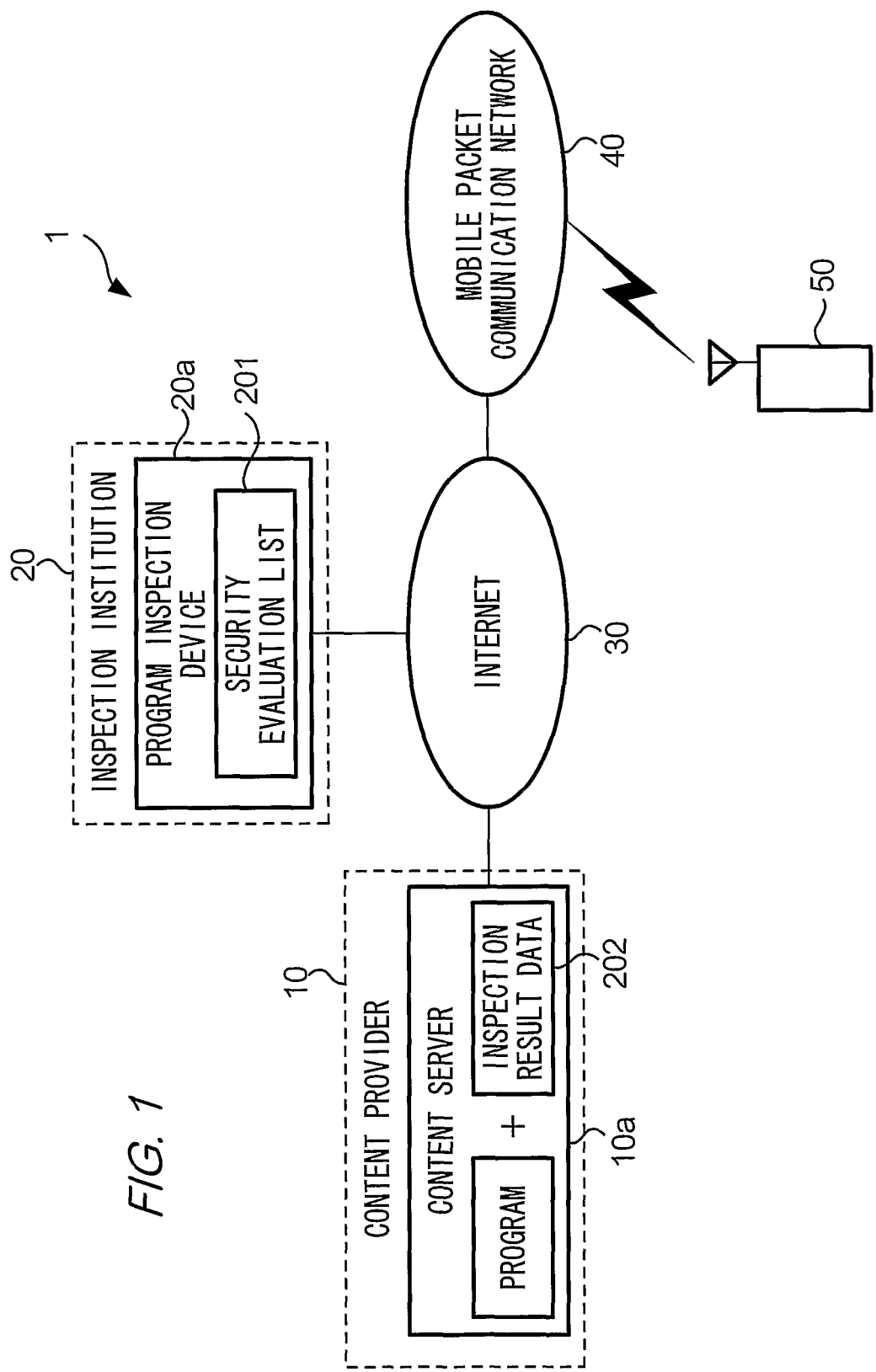
FIG. 1 is a block diagram illustrating a configuration of a communication system according to the first embodiment.

FIG. 1 is a block diagram illustrating a configuration of communication system according to the first embodiment. In FIG. 1, content provider 10 is a service provider that provides content to mobile phone 50. Content server 10a conducts packet communication with mobile phone 50 via Internet 30 and mobile packet communication network 40. Content server 10a stores programs for mobile phone 50 and inspection result data 202 which are obtained as a result of inspection of the program in inspection institution 20. The programs stored in content server 10a may be software containing image or audio data used when a program is executed.

Inspection institution 20 is an institution which inspects a program provided to mobile phone 50 upon an inspection request from content provider 10, and program inspection device 20a stores security evaluation list 201. In security evaluation list 201 there are listed functions such as a function call and a system call which may compromise security in mobile phone 50 if provided with a program via a network and the program is executed. Security evaluation list 201 also lists resources accessible by mobile phone 50 which may compromise security in mobile phone 50 if accessed in accordance with a program provided via a network.

Program inspection device 20a analyzes a program to be inspected with reference to security evaluation list 201, and extracts from the program functions listed in security evaluation list 201. Program inspection device 20a also identifies, among resources accessed when the program is executed, resources listed in security evaluation list 201. Subsequently, program inspection device 20a generates inspection result data 202 containing the names of the extracted functions and information on the identified resources (for example, URLs or paths indicating where the resources have been stored or identifiers assigned to the resources). Inspection result data 202 is returned to content provider 10 and stored along with the program in content server 10a.

Program inspection device 20a may record as inspection result data 202 all functions contained in a program to be inspected, or may record all resources accessed when a program to be inspected is executed.

Mobile phone 50 is a communication terminal (receiving device) served by mobile packet communication network 40, and can download a program from content server 10a and execute it.

FIG. 2 is a diagram illustrating a data structure of inspection result data 202. As shown in FIG. 2, inspection result data 202 contains the name of an inspected program, the name of a hash algorithm used for calculating a hash value of the program, and the calculated hash value. Inspection result data 202 also contains a list of the name of functions contained in the program and a list of information on resources accessed when the program is executed, which are obtained as a result of an analysis of the program using security evaluation list 201. The hash value contained in inspection result data 202 is used for verifying that the program has not been changed or falsified after inspection by program inspection device 20a.

Figure 3:
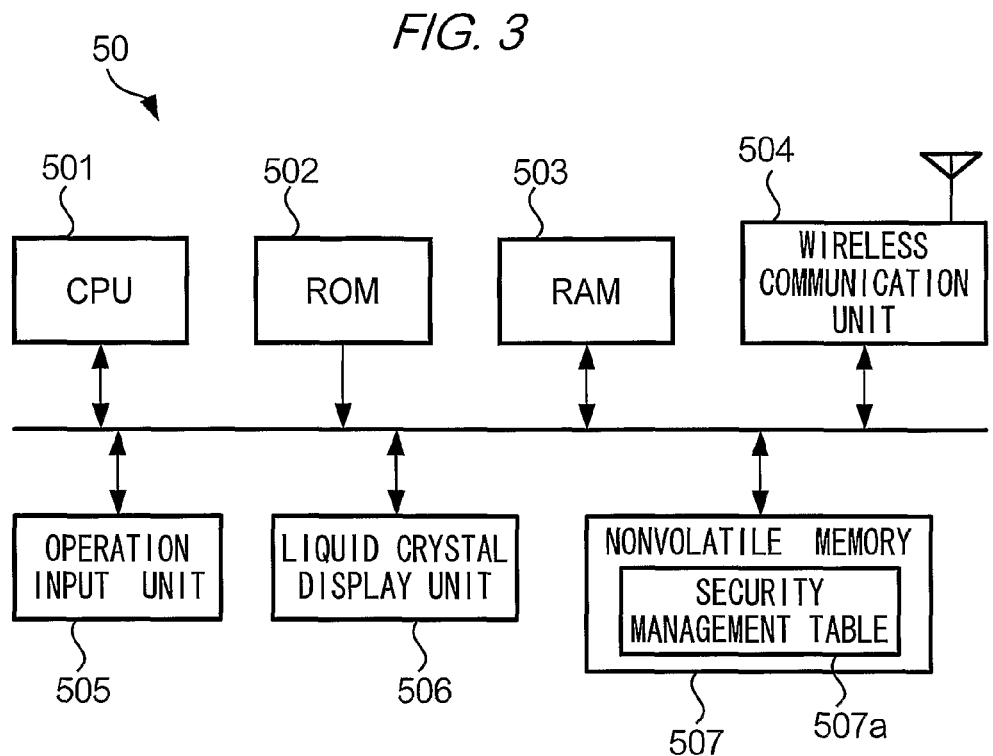
FIG. 3 is a block diagram illustrating a hardware configuration of mobile phone 50 according to the first embodiment.

FIG. 3 is a block diagram illustrating a hardware configuration of mobile phone 50. CPU 501 executes a variety of programs stored in ROM 502 and nonvolatile memory 507, and thereby controls components of mobile phone 50. ROM 502 stores programs for controlling mobile phone 50. RAM 503 is used as a work area of CPU 501. Wireless communication unit 504, under the control of CPU 501, controls wireless communication with a base station (not shown) of mobile packet communication network 40. Operation input unit 505 consists of a plurality of keys, and outputs an operation signal to CPU 501 in response to an operation of the keys. Liquid crystal display unit 506 consists of a liquid crystal display panel and a driving circuit for controlling a display of the liquid crystal display panel.

Nonvolatile memory 507 stores software such as an operating system and a WWW (World Wide Web) browser for mobile phone 50. Nonvolatile memory 507 also stores programs downloaded from content server 10a and stores inspection result data 202 thereof. Nonvolatile memory further stores security management table 507a.

Security management table 507a, as shown in FIG. 4, registers, among functions contained in programs for mobile phone 50, the names of functions permitted to be used when a program received via a network is executed, and the names of functions not permitted to be used when a program received via a network is executed. Security management table 507a also registers, among resources accessible by mobile phone 50, information on resources permitted to be accessed when a program received via a network is executed, and information on resources not permitted to be accessed when a program received via a network is executed. As to a function and a resource which require asking a user whether to execute a program, a term "user confirmation" is registered in the item "permission" column of security management table 507a.

Nonvolatile memory 507 stores a plurality of security management tables 507a for each security level available in mobile phone 50 such as security management table 507a for "Level 1" or security management table 507a for "Level 2". In mobile phone 50, when it is determined whether to execute a program received via a network, security management table 507a corresponding to a security level presently set in mobile phone 50 is used among the plurality of security management tables 507a. The security level is set by a user of mobile phone 50.

Functions registered in security management table 507a and information on whether to permit uses of the functions may be changed by a user of mobile phone 50. This is the same for resources registered in security management table 507a and information on whether to permit access of the resources.

Operations of the first embodiment will now be described below.

Figure 5:
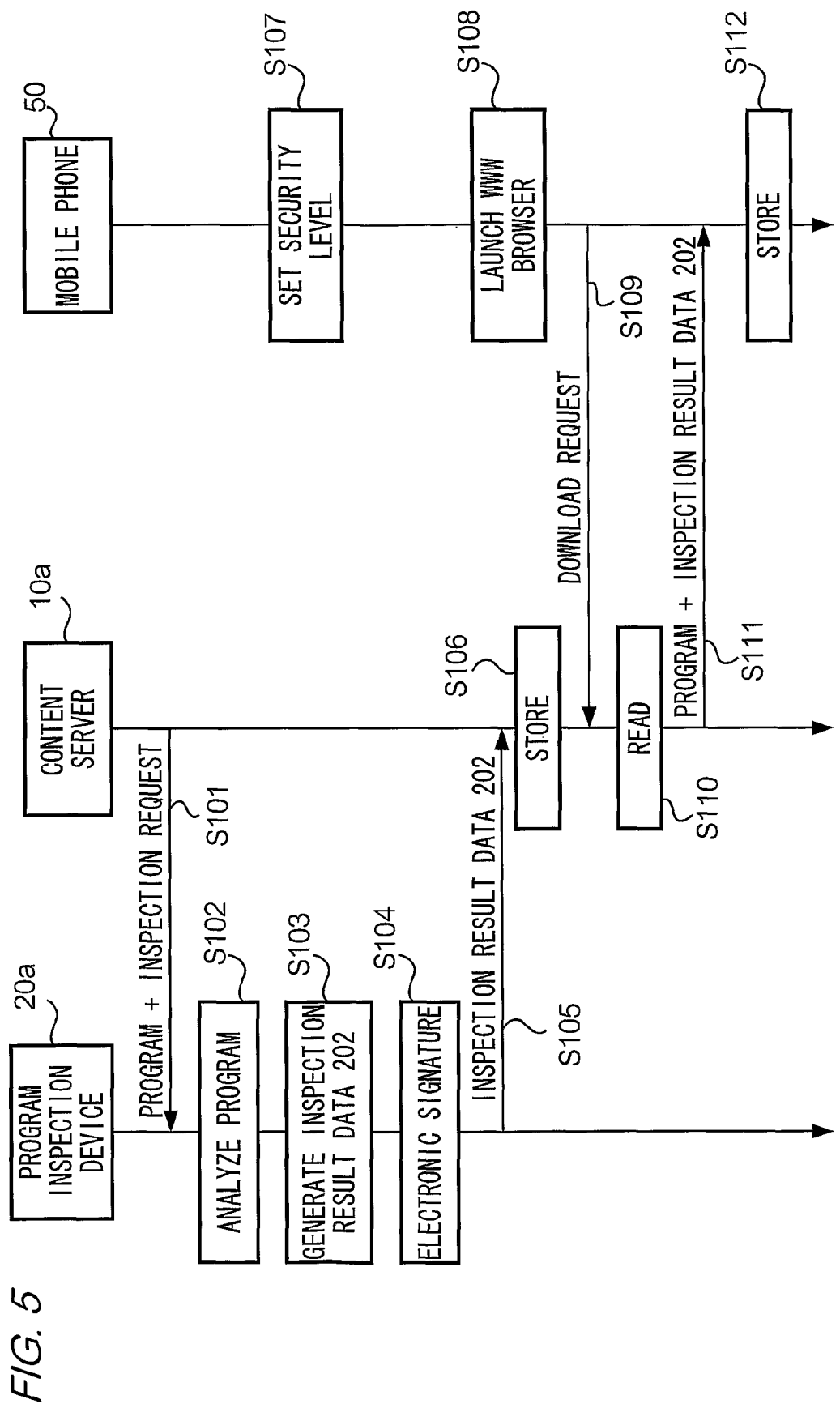
FIG. 5 is a sequence chart illustrating operations of each component forming communication system 1 according to the first embodiment, which are performed until a program and inspection result data 202 thereof are downloaded to mobile phone 50.

FIG. 5 is a sequence chart illustrating operations of each component forming communication system 1, which are performed until a program and corresponding inspection result data 202 are downloaded to mobile phone 50. As shown in FIG. 5, a program for mobile phone 50 written by content provider 10 is sent along with an inspection request from content server 10a to program inspection device 20a (Step S101).

Program inspection device 20a, upon receipt of the program and the inspection request, analyzes the received program (Step S102). Program inspection device 20a extracts from the program functions listed in security evaluation list 201, and identifies resources which are accessed if the program is executed, and which are listed in security evaluation list 201. Program inspection device 20a also calculates a hash value of the program using a hash algorithm. Program inspection device 20a then generates inspection result data 202 containing the names of the extracted functions, the information on the identified resources, the calculated hash value, the name of the algorithm used, and the file name of the program (Step S103).

Subsequently, program inspection device 20a attaches an electronic signature to the generated inspection result data 202 (Step S104). This electronic signature is used for verifying in mobile phone 50 that the program has not been changed or falsified. After that, program inspection device 20a returns inspection result data 202 with the electronic signature to content server 10a (Step S105). Content server 10a, upon receipt of inspection result data 202, stores inspection result data 202 with the inspected program in a memory (Step S106), and renders the program and inspection result data 202 downloadable by mobile phone 50.

Figure 6:
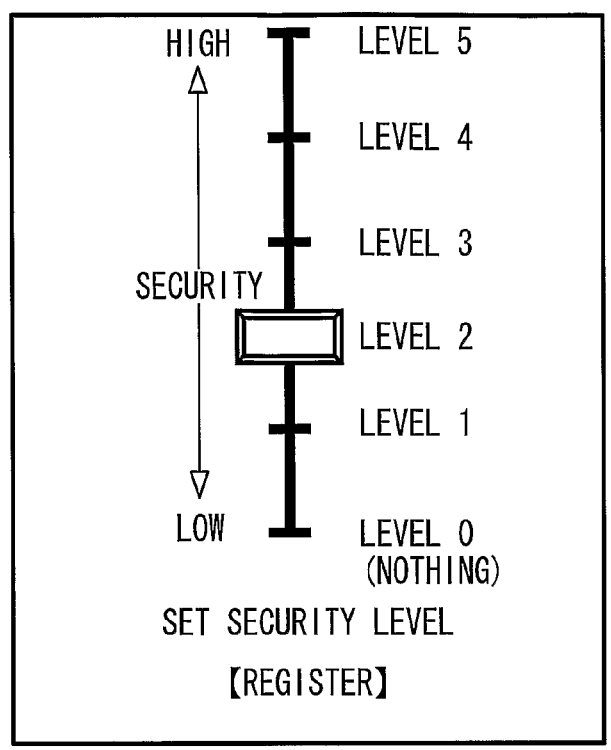
FIG. 6 is a diagram illustrating a screen displayed on a mobile phone 50 when a security level is set according to the first embodiment.

In mobile phone 50, a security level is set (Step S107). In the setting of a security level, a screen shown in FIG. 6 is displayed on liquid crystal display unit 506, and a user can select a security level of mobile phone 50 from "Level 0 (Nothing)" to "Level 5" using operation input unit 505. The security level set by the user is stored in nonvolatile memory 507.

If mobile phone 50 downloads a program from content server 10a, a WWW browser is launched in mobile phone 50 (Step S108), and packet communications are started between mobile phone 50 and content server 10a. When the user selects a program to be downloaded using operation input unit 505, a signal requesting download of the program is sent from mobile phone 50 to content server 10a (Step S109). Content server 10a reads the requested program and inspection result data 202 of the program from memory, and sends them to mobile phone 50 (Steps S110 and S111). Mobile phone 50, upon receipt of the program and inspection result data 202, stores them in nonvolatile memory 507 (Step S112).

Figure 7:
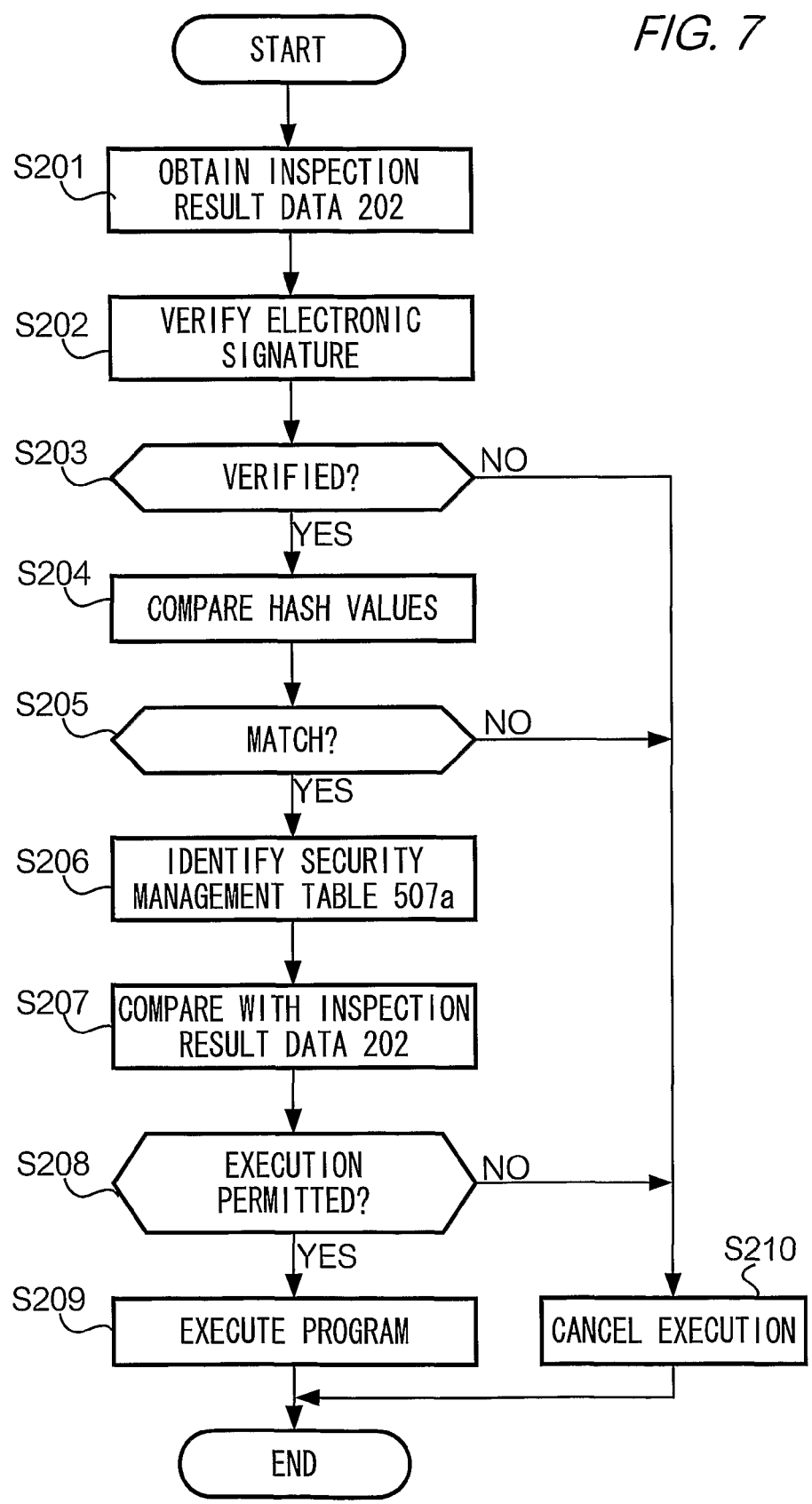
FIG. 7 is a flowchart illustrating operations for determining whether to execute a program received via a network, which operations are carried out in mobile phone 50 according to the first embodiment.

FIG. 7 is a flowchart illustrating operations of determining whether to execute a program received via a network, and which are carried out in mobile phone 50. The operations are carried out by CPU 501 if the execution of a program received via a network is instructed in mobile phone 50. As shown in FIG. 7, CPU 501 reads from nonvolatile memory 207 inspection result data 202 of a program the execution of which has been instructed (Step S201).

CPU 501 verifies an electronic signature of inspection result data 202 (Step S202), and thereby confirms that inspection result data 202 has been generated by inspection institution 20, and that inspection result data 202 is an authentic inspection result data which has not been falsified. If, as a result of the verification of the electronic signature, it is found that inspection result data 202 is not authentic (Step S203: NO), CPU 501 cancels the execution of the program (Step S210), and causes liquid crystal display unit 506 to display a message stating that the execution of the program has been cancelled because falsification has been found in inspection result data 202.

On the other hand, if inspection result data is verified to be authentic (Step S203: YES), CPU 501 calculates a hash value of the program using a hash algorithm described in inspection result data 202. CPU 501 compares the calculated hash value and a hash value described in inspection result data 202 (Step S204). As a result of the comparison, if the hash values do not match (Step S205: NO), CPU 501 cancels the execution of the program (Step S210), and causes liquid crystal display unit 506 to display a message stating that execution of the program has been cancelled because falsification has been found in the program.

On the other hand, if the hash values match (Step S205: YES), CPU 501 identifies a value of a security level currently set in mobile phone 50, and reads from nonvolatile memory 507 security management table 507a corresponding to the identified value of the security level (Step S206). CPU 501 compares the read security management table 507a and inspection result data 202 read in Step S201 (Step S207), and thereby determines whether to execute the program (Step S208).

To explain the operations in Steps S207 and S208 specifically, CPU 501, for each function described in inspection result data 202, namely for each function extracted from the program to be executed, determines whether the function is a function permitted to be used in security management table 507a. Similarly, CPU 501, for each resource described in inspection result data 202, determines whether the resource is a resource permitted to be accessed in security management table 507a.

Figure 8:
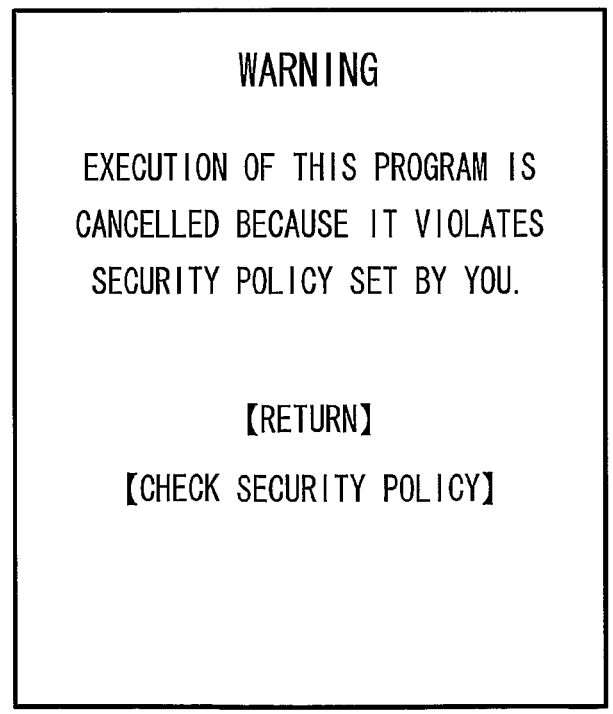
FIG. 8 is a diagram illustrating a screen displayed on mobile phone 50 when execution of a program is not permitted according to the first embodiment.

As a result, if any function that are not permitted to be used is contained in inspection result data 202, or if any resource not permitted to be accessed is contained in inspection result data 202, CPU 501 determines that the program violates the security policy (security management table 507a) set by a user, and does not permit the execution of the program (Step S208: NO). Consequently, CPU 501 cancels the execution of the program (Step S210), and causes liquid crystal display unit 506 to display a message as shown in FIG. 8.

For example, assuming that inspection result data 202 is as shown in FIG. 2 and security management table 507a is as shown in FIG. 4, since inspection result data 202 contains a function "Function 1 ( )" which is not permitted to be used according to security management table 507a, and a resource "Local/UserData/AddressBook" which is not permitted to be accessed according to security management table 507a, a program corresponding to inspection result data 202 is not permitted to be executed in mobile phone 50.

On the other hand, if all of the functions described in inspection result data 202 are functions that are permitted to be used according to security management table 507a, and all resources described in inspection result data 202 are resources permitted to be accessed according to security management table 507a, CPU 501 determines that the program meets the security policy set by the user, and permits the execution of the program (Step S208: YES). Consequently, CPU 501 reads the program permitted to be executed from nonvolatile memory 507, launches the program (Step S209), and proceeds with operations in accordance with the program.

If inspection result data 202 contains a resource requiring a user confirmation as a resource "http://www.xxx.co.jp" in security management table 507a of FIG. 4, CPU 501 generates a message asking a user whether to execute a program, causes liquid crystal display unit 506 to display it, and determines the execution of the program in accordance with an instruction from operation input unit 505.

As stated above, in the present embodiment, program inspection device 20a pre-inspects the content of a program provided to mobile phone 50 via a network, and generates inspection result data 202 containing functions contained in the program and information on resources accessed when the program is executed. Mobile phone 50 compares inspection result data 202 and security management table 507a registering information on whether a function may be used for each function and information on whether a resource may be accessed for each resource, and thereby determines whether to execute the program received via the network. Accordingly, mobile phone 50, without analyzing the received program, only by comparing inspection result data 202 and security management table 507a, can determine whether the program meets the security policy (security management table 507a) set in mobile phone 50. Consequently, the determination process can be completed in mobile phone 50 by using a simple method and within a short time.

Security management table 507a for determining whether to execute a received program can be changed easily by changing a security level. Accordingly, even if a program violates a security policy and thereby is determined not permitted to be executed, if a user determines that the program is valid, the program can be executed in mobile phone by temporarily lowering the security level. As stated above, in the present embodiment, flexible setting of a security level of mobile phone 50 relative to a received program can be carried out in accordance with a user's wishes.

B. Second Embodiment

Below, the second embodiment of the present invention will be described.

In the present embodiment, elements common to the first embodiment are denoted by like symbols, and descriptions common to the first embodiment will be omitted.

Figure 9:
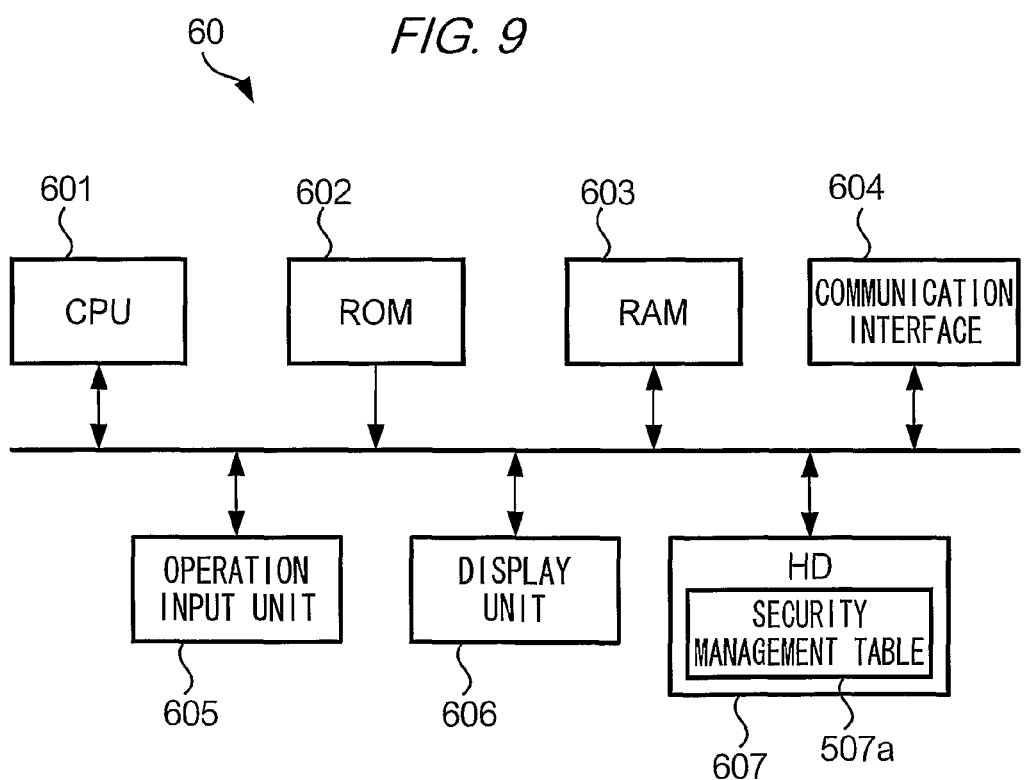
FIG. 9 is a block diagram illustrating a hardware configuration of relay device 60 according to the second embodiment.

FIG. 9 is a block diagram illustrating a hardware configuration of relay device 60 relaying packet communications between content server 10a and mobile phone 50. Relay device 60 may be provided on either of Internet 30 or mobile packet communication network 40. In FIG. 9, communication interface 604, under the control of CPU 601, controls packet communication with content server 10a or mobile phone 50. Operation input unit 605 has a mouse and a keyboard, and outputs an operation signal to CPU 601 in accordance with operations carried out via the mouse and the keyboard. Display unit 606 is a LCD or CRT display.

HD (Hard Disk) 607 stores security management table 507a explained in the first embodiment. Relay device 60 of the present embodiment, using security management table 507a, determines whether to relay a program sent from content server 10a to mobile phone 50. Relay device 60 receives, along with the program, inspection result data 202 of the program and destination information indicating the destination of the program from content server 10a. Inspection result data 202 is generated by program inspection device 20a explained in the first embodiment. The address information is a communication address assigned to mobile phone 50 such as an IP address.

In the present embodiment, a security level in relay device 60 is set by a carrier of mobile packet communication network or an administrator of relay device 60. HD 607 stores different security management tables 507a for each security level as described in the first embodiment, and in accordance with the security level set in relay device 60, security management table 507a for determining whether to relay a program is determined.

Figure 10:
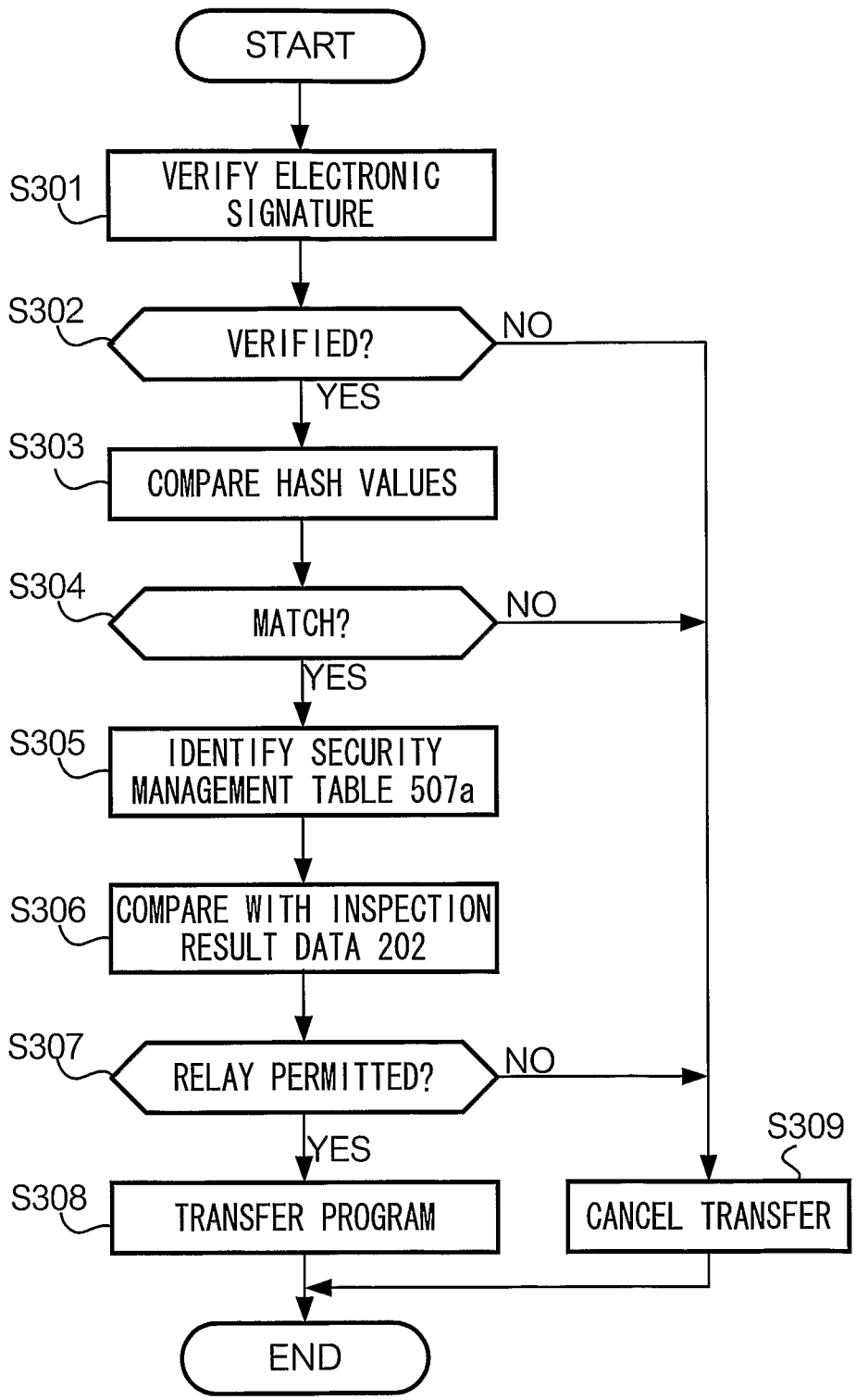
FIG. 10 is a flowchart illustrating operations of determining whether to execute a program received via a network, which operations are carried out in relay device 60 according to the second embodiment.

FIG. 10 is a flowchart illustrating operations performed for determining whether to relay a program which are carried out in relay device 60. The operations are performed by CPU 601 if relay device 60 receives a program and inspection result data 202 thereof transmitted from content server 10a to mobile phone 50. As shown in FIG. 10, CPU 601 verifies an electronic signature of inspection result data 202 (Step S301). If upon verification of the electronic signature, it is confirmed that inspection result data 202 is not authentic (Step S302: NO), CPU 601 cancels transfer of the program to mobile phone 50 (Step S309), and sends to mobile phone 50 a message stating that the download of the program has been cancelled because falsification has been found in inspection result data 202.

On the other hand, if inspection result data is verified to be authentic (Step S302: YES), CPU 601 calculates a hash value of the program using a hash algorithm described in inspection result data 202, and compares the calculated hash value and a hash value described in inspection result data 202 (Step S303). If as a result of the comparison, it is determined that the hash values do not match (Step S304: NO), CPU 601 cancels transfer of the program to mobile phone 50 (Step S309), and sends to mobile phone 50 a message stating that download of the program has been cancelled because falsification has been found in the program.

On the other hand, if the hash values match (Step S304: YES), CPU 601 identifies a value of a security level set in relay device 60 at the time, and reads from HD 607 security management table 507a corresponding to the identified value of the security (Step S305). CPU 601 compares the read security management table 507a and the received inspection result data 202 (Step S306), and thereby determines whether to relay the program to mobile phone 50 (Step S307).

To explain the operations in Steps S306 and S307 specifically, CPU 601, for each function described in inspection result data 202, namely for each function extracted from the received program, determines whether the function is a function permitted to be used according to security management table 507a. Similarly, CPU 601, for each resource described in inspection result data 202, determines whether the resource is a resource permitted to be accessed according to security management table 507a.

As a result, if any functions that are not permitted to be used exist in inspection result data 202, or if any resources that are not permitted to be accessed exist in inspection result data 202, CPU 601 determines that the program violates the security policy (security management table 507a) set by, for example a carrier of mobile packet communication network 40, and does not permit relay of the program to mobile phone 50 (Step S307: NO). Consequently, CPU 601 cancels the transfer of the program (Step S309), and sends to mobile phone 50 a message stating that the download of the program has been cancelled.

On the other hand, if all functions described in inspection result data 202 are functions permitted to be used according to security management table 507a, and all resources described in inspection result data 202 are resources permitted to be accessed according to security management table 507a, CPU 601 determines that the received program meets the security policy set by the carrier of mobile packet communication network 40, and permits the relay of the program to mobile phone 50 (Step S307: YES). Consequently, CPU 601 transfers the program to mobile phone 50 designated by the address information (Step S308).

As stated above, in the present embodiment, program inspection device 20a pre-inspects the content of a program provided to mobile phone 50 via a network, and generates inspection result data 202 containing functions contained in the program and information on resources accessed when the program is executed. Relay device 60 compares inspection result data 202 and security management table 507a registering information for each function on whether that function may be used and information on each resource on whether that resource may be accessed; and thereby determines whether to relay the program to mobile phone 50. Accordingly, relay device 60, without analyzing the program to be relayed, only by comparing inspection result data 202 and security management table 507a, can determine whether the program meets the security policy (security management table 507a) set in relay device 60. Consequently, the determination process can be completed in relay device 60 by using a simple method and within a short time, thereby avoiding any delay in communications. Also, since transfer of a program violating a security policy is cancelled, provision of such a program to mobile phone 50 is prevented.

Functions registered in security management table 507a and information on which functions may be used can be changed by a carrier of mobile packet communication network 40 or by an administrator of relay device 60. This is the same for resources registered in security management table 507a and information on which resources may be accessed.

Figure 11:
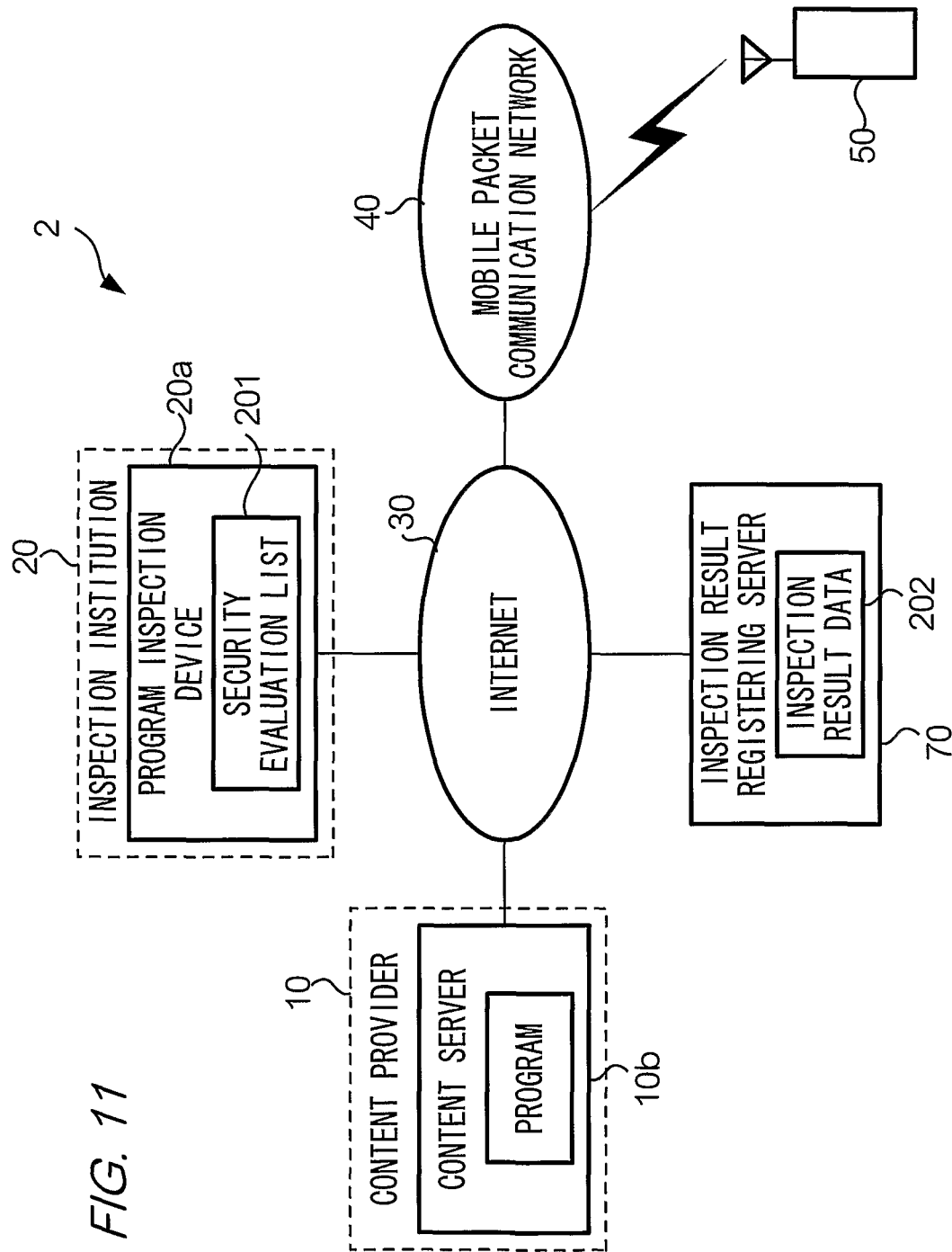
FIG. 11 is a block diagram illustrating a configuration of communication system 2 according to the modification (1).

C. Modifications (1) In the first embodiment, inspection result data 202 is sent to mobile phone 50 along with a program. However, as shown in FIG. 11, there may be provided inspection result registering server 70 for registering inspection result data 202 of each program inspected in inspection institution 20. In this case, mobile phone 50, after downloading a program from content server 10b, obtains inspection result data 202 of the program from inspection result registering server 70. This is the same as in the second embodiment, namely, inspection result registering server 70 registers inspection result data 202 of each program, and relay device 60, if receiving a program to be transferred to mobile phone 50 from content server 10b, obtains inspection result data 202 of the program from inspection result registering server 70. Inspection result registering server 70 may be provided either on mobile packet communication network 40 or in inspection institution 20.

Figure 12:
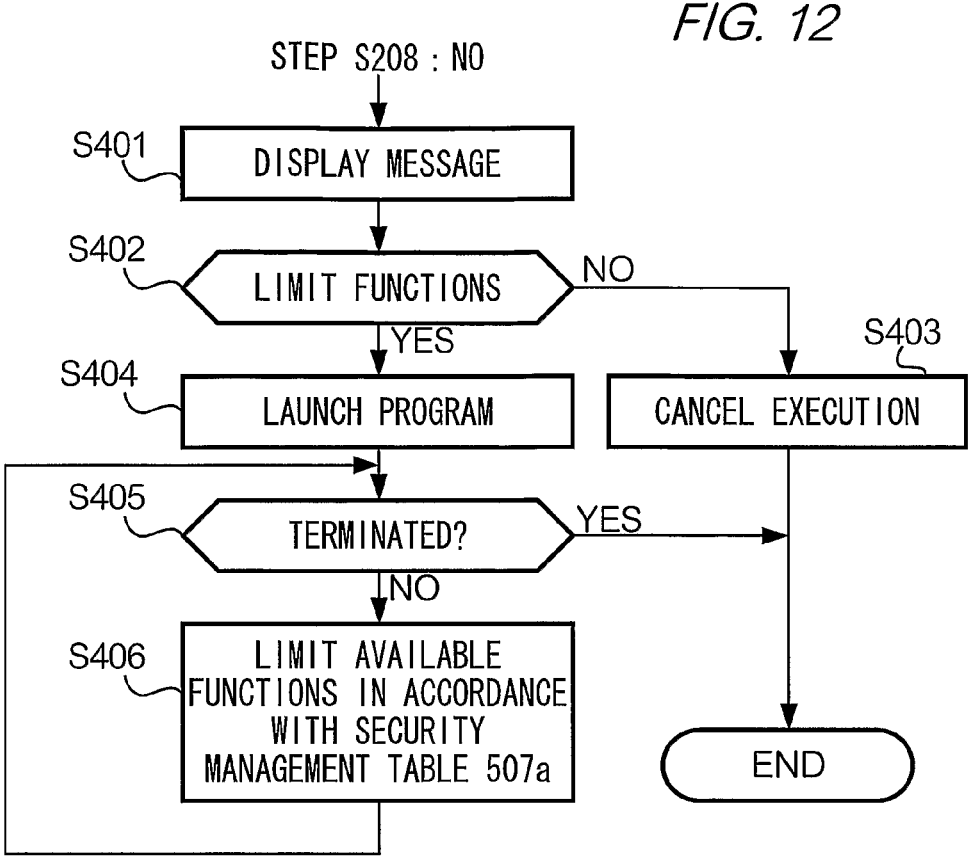
FIG. 12 is a flowchart illustrating operations carried out in mobile phone according to the modification (2).

(2) In the first embodiment, when a determination in Step S208 of FIG. 7 is negative, operations may be changed as shown in FIG. 12.

Figure 13:
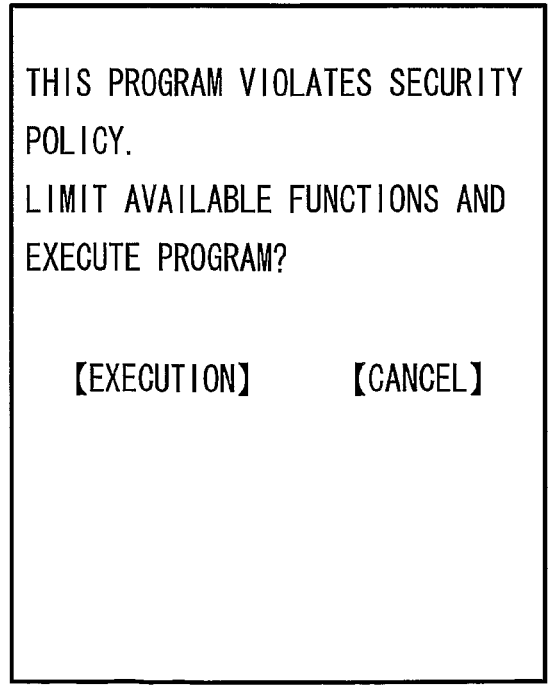
FIG. 13 is a diagram illustrating a screen displayed on mobile phone 50 according to the modification (2).

Namely, CPU 501, if a determination in Step S208 of FIG. 7 is negative, causes liquid crystal display unit 506 to display, as shown in FIG. 13, a message that a program to be executed violates a security policy, and a message confirming whether the program should be executed with available functions limited (Step S401). Responsive to these messages, a user instructs mobile phone 50 using operation input unit 505 to execute the program with available functions limited or to cancel execution of the program. The messages may be outputted as voice messages from mobile phone 50.

CPU 501, if canceling execution of the program is instructed via operation input unit 505 (Step S402: NO), cancels execution of the program (Step S403). On the other hand, if execution of the program is instructed via operation input unit 505 (Step S402: YES), CPU 501 reads the program from nonvolatile memory 507 and launches it (Step S404). After that, CPU 501 determines whether the running program has been terminated (Step S405), and until termination of the running program, limits functions available in the program in accordance with security management table 507a (Step S406). Security management table 507a for limiting available functions corresponds to a security level set in mobile phone 50 at that time.

To explain the operations in Step S406 specifically, if CPU 501 identifies a function such as a function call and a system call when sequentially interpreting and running the program, CPU 501 determines whether the function is a function permitted to be used according to security management table 507a. If the function is a function permitted to be used, CPU 501 permits the use of the function and continues the running of the program. On the other hand, if the function is a function not permitted to be used, CPU 501 does not permit the use of the function and suspends the running of the program.

Also, CPU 501 monitors an access request to a resource occurring when sequentially interpreting and running the program, and determines whether the resource for the access request is a resource permitted to be accessed according to security management table 507a. If the resource is a resource permitted to be accessed, CPU 501 permits an access to the resource and continues the running of the program. On the other hand, if the resource is a resource not permitted to be accessed, CPU 501 does not permit an access to the resource and suspends the running of the program.

According to the configuration stated above, mobile phone 50 can execute even a program violating a security policy by limiting available functions of the program.

(3) Security management table 507a may register only functions permitted to be used and those not permitted to be used; while security management table 507a may register only information on resources permitted to be accessed and those not permitted to be accessed. Further, security management table 507a may register only functions permitted to be used or only functions not permitted to be used; while security management table 507a may register only resources permitted to be accessed or only resources not permitted to be accessed.

(4) In the second embodiment, HD 607 of relay device 60 may register for each mobile phone 50 a security level set by a user of mobile phone 50. In this case, relay device 60 may identify a security level of mobile phone 50 to which a program is to be transferred, and determine whether to relay the program using security management table 507a corresponding to the security level.

(5) In the first embodiment, nonvolatile memory 507 of mobile phone 50 may store a security management table for a program to which inspection result data 202 has not been attached. Also, nonvolatile memory 507, if there are a plurality of inspection institutions similar to inspection institution 20, may store a security management table for a program to which inspection result data generated in an inspection institution other than inspection institution 20 has been attached. This is the as same in the second embodiment; namely, HD 607 may store a security management table for a program to which inspection result data 202 has not been attached, or a security management table for a program to which inspection result data generated in an inspection institution other than inspection institution 20 has been attached.

(6) In the first embodiment, inspection result data 202 may further contain provider identification information for identifying a provider of a program such as the name of a content provider or a URL of a program sending source; and nonvolatile memory 507 of mobile phone 50 may store different security management tables 507a for each provider identification information. In this case, mobile phone 50 may determine whether to execute a received program using security management table 507a corresponding to a provider identification information contained in received inspection result data 202. This is the same in the second embodiment, namely, inspection result data 202 may further contain a provider identification information, HD 607 of relay device 60 may store different security management tables 507a for each provider identification information; and relay device 60 may determine whether to relay a received program using security management table 507a corresponding to a provider identification information contained in received inspection result data 202.

(7) In the first embodiment, mobile phone 50, on completion of downloading a program, may determine whether the program meets a security policy (security management table 507a) by comparing inspection result data 202 of the program and security management table 507a, and cause liquid crystal display unit 506 to display the determination result. The determination result may be outputted as voice messages from mobile phone 50. Also, mobile phone 50, when instructed by a user using operation input unit 505 to check the safety of a received program, may determine whether the program meets a security policy by comparing inspection result data 202 of the program and security management table 507a, and output the determination result.

In the cases stated above where a determination is made not as to whether program should be executed but as to whether the program meets a security policy, and the determination result is reported to a user, the user, on the basis of the reported determination result, deletes (uninstalls) the program from nonvolatile memory 507 or avoids execution of the program, which consequently maintains the security of mobile phone 50. In this case, if the program violates the security policy, the names of functions not permitted to be used and information on resources not permitted to be accessed, which are contained in the program, may be reported to the user along with the determination result. Alternatively, if the program violates the security policy, mobile phone 50 may cause liquid crystal display unit 506 to display a message confirming whether to delete the program, and if instructed by use of operation input unit 505 to delete the program, will uninstall the program from nonvolatile memory 507.

In the second embodiment, relay device 60, when transferring a program to mobile phone 50, may determine whether the program meets a security policy (security management table 507a) by comparing inspection result data 202 of the program and security management table 507a, and send the determination data to mobile phone 50 along with the program.

(8) In the first embodiment, mobile phone 50, before downloading a program from content server 10a, may download only inspection result data 202 of the program from content server 10a. In this case, mobile phone 50 compares received inspection result data 202 and security management table 507a, and thereby determines whether the program to be downloaded meets a security policy (security management table 507a). As a result of the determination, if the program meets the security policy, mobile phone 50 downloads the program from content server 10a. On the other hand, if the program violates the security policy, mobile phone 50 cancels download of the program. According to this configuration, if a program to be downloaded violates a security policy, downloading the program is prevented, and consequently unnecessary packet communications can be avoided.

(9) In the first and second embodiment, a program may be distributed to mobile phone 50 instead of being downloaded. A receiving device according to the present invention may be applied to a wireless terminal communicating via a public wireless LAN or a personal computer communicating via the Internet. A relay device according to the present invention may be applied to a gateway server, a proxy server, or a switching center or a base station provided on mobile packet communication network 40. A program for causing a computer such as mobile phone 50 or relay device 60 to execute processes according to the present invention may be installed in a computer via a network, or may be stored in a variety of computer-readable storage media for distribution.

The invention claimed is:

1. A receiving device comprising:
 a storing unit that stores security management information including at least one of 1) information of a plurality of functions permitted to be used by the receiving device and 2) information on resources accessed by a plurality of programs executed on the receiving device; and
 an electronic processor that is configured to:
  receive one of the plurality of programs and inspection information of the one program including at least one of the plurality of functions contained in the one program and information on resources accessed when the one program is executed;
  receive the inspection information before receiving the one program via the network;
  determine whether to receive the one program, by comparing the inspection information electronic processor and the security management information stored by the storing unit before the one program is received, wherein
   when the electronic processor determines to receive the one program, the electronic processor receives the one program via the network, and
   when the electronic processor determines not to receive the one program, the electronic processor cancels the receipt of the one program; and
  execute the one program received.

2. The receiving device of claim 1, wherein the electronic processor determines whether to receive the one program by comparing the inspection information and the security management information based on a security policy set in the receiving device.

3. A non-transitory computer-readable storage medium on which a set of instructions is recorded, the set of instructions causing a computer to execute:
 a first step of receiving, before receiving one program from a plurality of programs via a network, inspection information of the one program including at least one of a plurality of functions contained in the one program and information on resources accessed by the computer when the one program is executed;
 a second step of determining, by comparing the inspection information received in the first step and security management information on whether the at least one of the functions contained in the one program and the information on the resources accessed by the computer when the one program is executed is permitted to be used, which is pre-registered in memory, whether to receive the one program associated with the inspection information;
 a third step of receiving the one program via the network when it is determined in the second step to receive the one program, wherein the determination of the second step is performed before the one program is received by the computer;
 a fourth step of executing the one program received in the third step; and
 a fifth step of canceling reception of the one program by the computer via the network when it is determined in the second step not to receive the one program.

4. The non-transitory computer-readable storage medium, on which the set of instructions is recorded, of claim 3, wherein comparing the inspection information and the security management information includes performing the comparison using a security polity set on the computer.

5. A receiving method, comprising:
 a first step of causing, by a processor of a computer, a communication unit of the computer to receive, before receiving one program from a plurality of programs via a network, inspection information of the one program including at least one of a plurality of functions contained in the one program and information on resources accessed by the computer when the one program is executed;
 a second step of determining, by the processor, by comparing the inspection information received in the first step and security management information on whether the at least one of the functions contained in the one program and the information on the resources accessed by the computer when the one program is executed is permitted to be used, which is pre-registered in memory, whether to receive the one program associated with the inspection information;
 a third step of causing, by the processor, the communication unit to receive the one program via the network when it is determined in the second step to receive the one program, wherein the determination of the second step is performed before the one program is received by the communication unit;
 a fourth step of executing, by the processor, the one program received in the third step; and
 a fifth step of canceling, by the processor, reception of the one program by the communication unit via the network when it is determined in the second step not to receive the one program.

6. The receiving method of claim 5, wherein comparing the inspection information and the security management information includes performing the comparison using a security polity set on the electronic processor.

* * * * *